United States Patent
Guven

(10) Patent No.: US 9,497,632 B2
(45) Date of Patent: Nov. 15, 2016

(54) SYSTEM AND METHOD FOR PAIRING A UICC CARD WITH A PARTICULAR MOBILE COMMUNICATIONS DEVICE

(75) Inventor: Mesut Guven, Allen, TX (US)

(73) Assignee: T-MOBILE USA, INC., Bellevue, WA (US)

( * ) Notice: Subject to any disclaimer, the term of this patent is extended or adjusted under 35 U.S.C. 154(b) by 755 days.

(21) Appl. No.: 12/636,016

(22) Filed: Dec. 11, 2009

(65) Prior Publication Data

US 2011/0081950 A1 Apr. 7, 2011

Related U.S. Application Data

(60) Provisional application No. 61/247,858, filed on Oct. 1, 2009.

(51) Int. Cl.
*H04B 5/00* (2006.01)
*H04M 1/66* (2006.01)
(Continued)

(52) U.S. Cl.
CPC ............... *H04W 12/08* (2013.01); *H04W 8/26* (2013.01)

(58) Field of Classification Search
CPC .......... H04W 88/02; H04W 12/06; H04W 12/02; H04W 12/08; H04W 8/26; H04W 8/28; H04W 8/245; H04W 8/265; H04W 12/04; H04W 48/04; H04W 48/18; H04W 76/02; H04W 88/06; H04W 8/183; H04W 8/205; H04W 8/24; H04W 48/02; H04W 52/0274; H04W 76/007; H04L 63/0853; H04L 63/083; H04L 63/126; H04L 63/10; H04L 63/12; H04L 63/0407; H04L 9/3226; H04L 9/3271; H04L 9/3273; H04L 2209/80; H04L 67/025; H04L 29/06; H04L 63/08; G06Q 20/341; G06Q 20/354; G06Q 20/363; G06Q 20/401; G06Q 20/3227; G06Q 20/3574; G06Q 20/3576; G06Q 20/32; G06Q 20/355; H04M 1/66;
(Continued)

(56) References Cited

U.S. PATENT DOCUMENTS 6,445,914 B1 * 9/2002 Findikli et al. ............... 455/411
2004/0176134 A1 * 9/2004 Goldthwaite et al. ........ 455/558
(Continued)

*Primary Examiner* — Yuwen Pan
*Assistant Examiner* — Paul P Tran
(74) *Attorney, Agent, or Firm* — Howison & Arnott, L.L.P.

(57) ABSTRACT

A method for pairing a mobile communications device card located within a mobile device with the mobile device, comprising the steps of accessing a first identifier associated with the mobile device responsive to actuation of the mobile device. Next, a comparison of the first identifier associated with the mobile device is made with a second identifier associated with the mobile communications device card. Authorization of the operation of a combination of the mobile communications device card and the mobile device is made responsive to the comparison determining the first and second identifiers match. Operation of the combination of the mobile communications device card and the mobile device is disabled responsive to the comparison determining the first and second identifiers do not match.

13 Claims, 3 Drawing Sheets

(51) Int. Cl.
  *H04M 1/68*     (2006.01)
  *H04M 3/16*     (2006.01)
  *H04W 4/00*     (2009.01)
  *H04K 1/00*     (2006.01)
  *H04L 9/00*     (2006.01)
  *G06F 21/00*    (2013.01)
  *G06F 15/16*    (2006.01)
  *H04L 29/06*    (2006.01)
  *H04L 9/32*     (2006.01)
  *H04W 12/08*    (2009.01)
  *H04W 8/26*     (2009.01)

(58) Field of Classification Search
  CPC ............... H04M 1/72519; H04M 1/72575;
       H04M 17/103; H04M 1/0274; H04M
       1/675; H04M 1/72525; H04M
       1/72577; H04M 2250/14; G06F 21/34;
       G06F 21/35; G06F 21/6254
  USPC ......... 455/410, 411, 414.1, 415, 435.2, 557,
       455/558, 41.1, 432.1, 452.1, 550.1;
       370/235, 328, 315; 710/310, 301;
       379/142.03; 705/50
  See application file for complete search history.

(56) References Cited

U.S. PATENT DOCUMENTS

| | | | |
|---|---|---|---|
| 2004/0266395 A1* | 12/2004 | Pailles et al. | 455/411 |
| 2005/0020308 A1* | 1/2005 | Lai | H04W 8/183 455/558 |
| 2005/0021940 A1* | 1/2005 | Ma | 713/155 |
| 2005/0075092 A1* | 4/2005 | Kim | 455/411 |
| 2005/0096088 A1* | 5/2005 | Bae | H04W 12/12 455/558 |
| 2006/0063564 A1* | 3/2006 | Sharma | H04W 8/26 455/558 |
| 2007/0155363 A1* | 7/2007 | Rager | H04M 3/38 455/410 |
| 2008/0161050 A1* | 7/2008 | Shudark et al. | 455/558 |
| 2008/0288585 A1* | 11/2008 | Choi et al. | 709/203 |
| 2008/0301785 A1* | 12/2008 | Beyer et al. | 726/5 |
| 2009/0227226 A1* | 9/2009 | Gupta et al. | 455/405 |
| 2009/0305668 A1* | 12/2009 | Ahn et al. | 455/410 |
| 2010/0029200 A1* | 2/2010 | Varriale et al. | 455/41.1 |
| 2010/0330968 A1* | 12/2010 | Pecen | 455/414.1 |
| 2011/0077051 A1* | 3/2011 | Brown et al. | 455/558 |
| 2011/0136482 A1* | 6/2011 | Kaliner | 455/418 |

* cited by examiner

SYSTEM AND METHOD FOR PAIRING A UICC CARD WITH A PARTICULAR MOBILE COMMUNICATIONS DEVICE

CROSS-REFERENCE TO RELATED APPLICATIONS

This application claims priority to U.S. Provisional Application Ser. No. 61/247,858, filed on Oct. 1, 2009, and entitled "UICC PAIRING METHOD," which is incorporated herein by reference.

TECHNICAL FIELD

The present invention relates to mobile communication devices, and more particularly, to a system and method for uniquely associating a UICC or similar type card with a particular mobile communication device.

BACKGROUND

Mobile handsets are capable of operating in multi-modes of operation wherein the handset may operate within, for example, an LTE (long-term evolution) network environment and another network communications environment such as a CDMA (code division multiple access) network. Existing topologies involving phones capable of operating in an LTE network and a CDMA network, have issues where unscrupulous individuals may utilize loop holes caused by the interactions between the mobile equipment communicating over the LTE and CDMA networks and the UICC (universal integrated chip card) card that enables communications through the mobile equipment. Most UICC cards include the functionalities necessary for a mobile device to communicate on an LTE network. However, functionalities enabling communications on a CDMA network are included upon the mobile equipment and does not necessarily require the use of information stored upon the UICC card. In this environment, the mobile equipment may work perfectly well within a CDMA network without requiring the inclusion of a UICC card within the mobile equipment. Alternatively, the UICC card could be inserted within a non-authorized mobile equipment to enable the non-authorized equipment to obtain LTE connectivity. These loop holes can create a number of undesirable issues for a service provider.

In a first situation, the UICC cards of two different subscribers could become interchanged wherein the cards were utilized within valid active network phone of the other subscriber. This could occur, for example, when the pair of subscribers were purchasing a subscription within a network store. Valid UICC cards and mobile devices could be obtained at the store and the UICC card of one subscriber could inadvertently be placed within the mobile device of the other subscriber. The UICC card/mobile device combination would work perfectly well, but the wrong subscriber's account would be charged for the air time used by the person having the inadvertently switched card and vice versa.

In another situation, an active UICC card could be placed within a non-active mobile communications device in order to provide LTE network access via the non-active device. Since all components necessary to communicate via the LTE network are located upon the UICC card, this configuration would enable LTE network access through the non-active mobile communications device while the separate active mobile communications device initially associated with the UICC card could be used solely for CDMA network access since all of the CDMA required network component are located upon the active mobile communications device. Thus, an unscrupulous subscriber could actually have two active devices on the network, namely, an LTE network communication device including the active LTE card and the non-active mobile communication device and the active mobile communication device on a CDMA network. A final problem that could arise is if the LTE card was used in conjunction with a LTE modem to provide data-only access to an LTE network via the UICC card. This is undesirable as it may cause undesired bandwidth usage on the LTE network.

Thus, there is a need for some manner for limiting the access of a UICC card such that the card will operate only with a single mobile communications device, and similarly, the mobile communications device will only operate with a single UICC card.

SUMMARY

The present invention, as disclosed and described herein, in one aspect thereof, comprises a method for pairing a mobile communication device card located within a mobile device and the mobile device. The method includes the step of accessing a first identifier associated with the mobile device responsive to actuation of the mobile device. A comparison of the first identifier associated with the mobile device with the second identifier associated with the mobile communication device card is made. Operation of the combination of the mobile communication device card and the mobile device is authorized responsive to the comparison determining the first and second identifiers match. Operation of the combination of the mobile communication device card and the mobile device is disabled responsive to the comparison determining that the first and second identifiers do not match.

BRIEF DESCRIPTION OF THE DRAWINGS

For a more complete understanding, reference is now made to the following description taken in conjunction with the accompanying Drawings in which.

DETAILED DESCRIPTION

Figure 1:
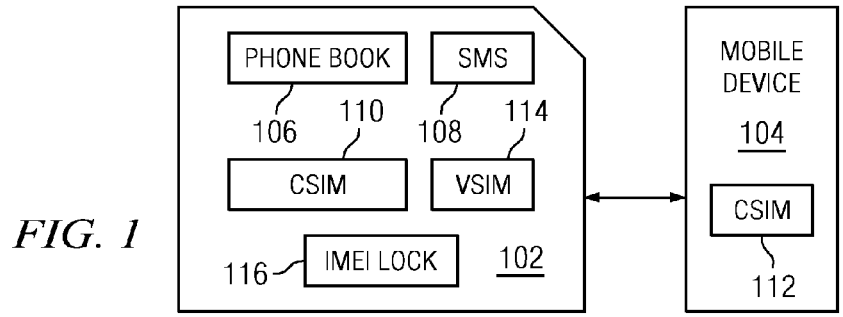
FIG. 1 is a functional block diagram showing a UICC card and associated mobile communication device.

Referring now to the drawings, wherein like reference numbers are used herein to designate like elements throughout, the various views and embodiments of a system and method for pairing a UICC card with a particular mobile communications device are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a UICC (universal integrated chip card) 102 that may be uniquely paired with a particular mobile device 104. It should be realized that the mobile device 104 may comprise any type of mobile communication device such as a cellular telephone, PDA, pager, modem, laptop computer or any other type of device capable of carrying out voice or data communications via an associated wireless network. The UICC card 102 may also be any type of similar card. The UICC card 102 and mobile device 104 will each include a unique identifier. This unique identifier may comprise the IMEI (international mobile equipment identity) number or the IMSI (international mobile subscriber identity) number. The identifier will be unique for each UICC card 102 and mobile device 104 pair. A mobile country code (MCC) and mobile network code (MNC) are also part of the IMSI number which are unique numbers that are assigned to a particular network provider. Once an IMEI number is associated with a particular mobile device 104, the mobile device 104 will read the IMSI number from the UICC card 102 and based upon software logic associated with the mobile device 104 and UICC card 102 will unlock the user interface associated with the mobile handset 104 and allow a user full access to the user interface if the necessary IMSI number is recognized and matched. Otherwise, the handset 104 locks the user interface and only enables outgoing emergency calls. While the present description is made with respect to the use of pairing an IMEI number with a card and mobile device, it should be realized that between card and mobile device can be made on any identifier.

The UICC card 102 includes phone book functionalities 106 enabling the UICC card 102 to store phone numbers and contact information for a variety of individuals that are stored upon the card 102 and accessible to the mobile device 104. SMS block 108 enables the mobile device 104 associated with the UICC card 102 to store short message services (SMS) from the mobile handset 104. SMS comprises a communication service used in a mobile communication system allowing the exchange of short text messages between mobile devices. The CSIM block 110 provides the functionalities necessary for carrying out communications over a CDMA network. However, it should be noted that with respect to the described embodiment, the CSIM functionalities 112 are also included within the mobile communication device 104. The mobile communication device 104 is capable of carrying out CDMA communications using the CSIM module 112 within the handset 104 without requiring the use of the CSIM functionalities 110 stored within the UICC card 102. While the present description is described with respect to the CSIM modules providing the ability to communicate over CDMA networks, it should be realized that the functionalities may be varied to enable communications within any mobile telecommunications network and the system described herein should not be limited to a CDMA and LTE network combination, but may comprise any combination of mobile telecommunication protocols and may comprise either two or more mobile telecommunication protocols. The USIM module 114 provides the functionalities within the UICC card 102 necessary for enabling communications with an LTE (long-term evolution) network. Thus, any device including the UICC card 102 would have the necessary functionalities for carrying out communications over an LTE network.

The IMEI lock module 116 provides the functionalities necessary for pairing the UICC card 102 with the mobile device 104 by a unique identifier code that is associated with each of the UICC card 102 and mobile device 104. The unique identifier may comprise the IMEI number or the IMSI number. However, the important thing is that the card 102 and mobile device 104 be paired via the unique identifier code and not which particular identifier code is utilized. Though, there is some benefit in utilizing the unique identifier code that are included within the subscriber profiles that are associated with the mobile communication device 104 and are presently within the protocol that is transmitted wirelessly via various wireless communication networks.

Figure 2:
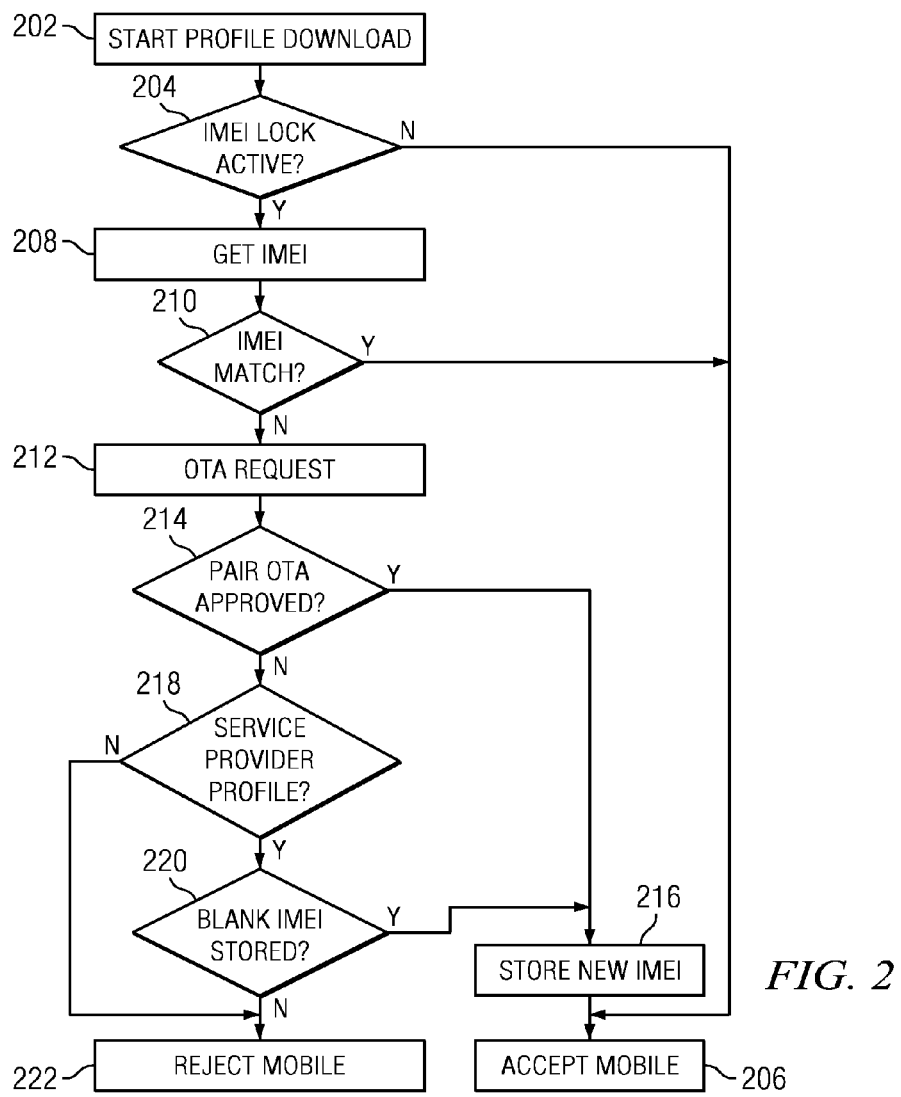
FIG. 2 is a flow diagram illustrating the manner for determining an IMEI code match between a UICC card and mobile communications device.

Referring now to FIG. 2, there is illustrated a flow diagram describing the manner of operation between the UICC card 102, mobile communication handset 104 and associated networks with respect to the IMEI lock functionality 116. While the following disclosure provides one embodiment for the logic for pairing a card and a mobile device, the logic for pairing at the UICC level as well as the network level can be flexible as long as the card and mobile device have a unique pairing. The process is initiated at step 202 by the downloading of a profile from the mobile communications device 104 to the UICC card 102. The mobile communications device profile provided to the UICC card 102 in one embodiment comprises a group of data at least 71 bytes in length. The profile includes information concerning the unique identification information associated with the mobile handset 104. Information within the profile can include things such as the international mobile equipment identity (IMEI) number, the international mobile subscriber identity (IMSI) number, the mobile country code (MCC), the mobile network code (MNC) and various other types of identifiers, codes and information necessary for carrying out communications over the CDMA or LTE networks.

After download of the profile from the mobile device 104, an initial determination is made at inquiry step 204 to determine if the IMEI lock flag is active. The IMEI lock flag is associated with the IMEI lock functionality 116 within the UICC card 102 and determines whether the operations performed by the IMEI lock functionality 116 are to be carried out. If not, control passes to step 206 and the UICC card 102 presently within the mobile device 104 is accepted. If the IMEI lock flag is set, the IMEI number is retrieved from the mobile device at step 208. Inquiry step 210 determines if the IMEI number downloaded matches the IMEI number presently stored within the UICC card 102. If the numbers match, the mobile device is accepted at step 206 with the determination of a valid mobile device and UICC card pairing. If inquiry step 210 determines that the IMEI numbers do not match, control passes on to step 212 wherein an over-the-air ("OTA") request is made.

The over-the-air request is an attempt to determine if a valid IMEI pairing exists using a network decision provided via the LTE or CDMA network. Inquiry step 214 determines if the present pair between the mobile handset 104 and UICC card 102 IMEI numbers is approved. If the IMEI number pairing is approved via the over-the-air request, control passes to step 216 and the IMEI number provided from the mobile handset 104 is stored within the UICC card 102 and this number becomes the IMEI number associated with the UICC card 102. The mobile device 104 is then accepted as a valid pairing for the UICC card at step 206. If inquiry step 214 determines that the pairing is not approved, control passes onward to inquiry step 218. This lack of approval can be based upon the fact that the provided pair of numbers by the mobile device 104 and UICC card 102 are not an acceptable pairing, or alternatively, the decision to not approve the pairing may be based upon the fact that an over-the-air request may not be transmitted to the network from the mobile device 104. If either of these situations occur, control passes to inquiry step 218. Another reason the IMEI pair may not be approved is if inquiry step 214 determines that the terminal profile downloaded from the mobile device 104 does not include BIP (Bearer Independent Protocol) capability. BIP is a standardized protocol used for communications between the UICC card and an OTA server. If the profile does not show BIP capability, the IMEI lock functionality 116 assumes that the pair cannot be over-the-air approved.

If the system is capable of approving the IMEI pair via the over-the-air request at step 212, the over-the-air server will verify whether the subscriber has the correct pairing of IMSI/IMEI via an HSS inquiry. If the identifiers comprise a valid pair, the over-the-air server sends a command back to the UICC card 102 indicating that it is a good pair. This enable the new IMEI to be stored at step 216 as described previously. If the over-the-air server determines that an invalid pair was received, the server will send an invalid command back to the UICC 102 and control will then pass on to inquiry step 218. Thus, the over-the-air approval at inquiry step 214 enables the correct/incorrect pairing decision to be made at the network level versus the local level.

If inquiry step 214 does not approve the over-the-air request pair at the network level, inquiry step 218 determines whether the service provider profile downloaded by the mobile device 104 comprises the service provider associated with the UICC card 102. If so, control passes to inquiry step 220 to determine if there is a blank IMEI stored within the IMEI storage location. This would provide an indication that an IMEI was not presently associated with the UICC card 102 and the card is still assignable. If the IMEI storage area is blank, the downloaded IMEI associated with the mobile device 104 is stored as a new IMEI at step 216, and the mobile device 104 is accepted at step 206. If inquiry step 218 determines that the downloaded profile from the mobile device 104 is not associated with the service provider issuing the UICC card 102, the mobile is rejected and cannot be paired with the UICC card 102. The user interface of the device will be disabled at step 222 to prevent use of the mobile device 104 and UICC card 102 pair. In this disabled state, the mobile device may only be used for making emergency calls.

Figure 3:
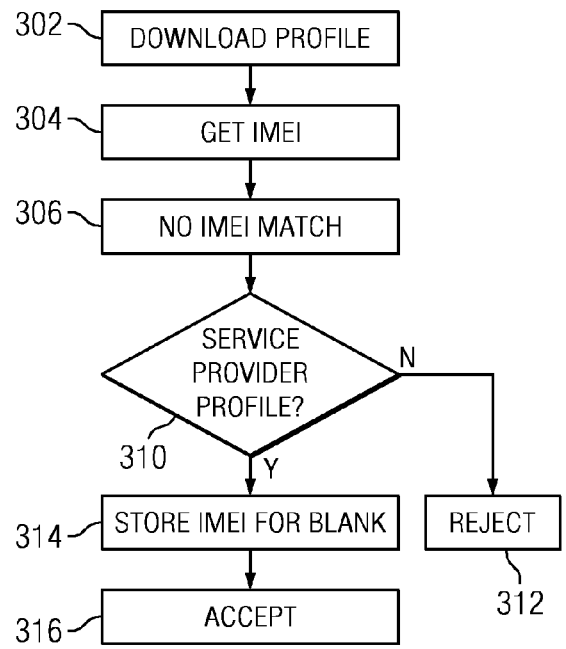
FIG. 3 illustrates the assigning of an IMEI number in a new UICC card.

Referring now to FIG. 3, there is a flow diagram illustrating the operation when a brand new UICC card 102 is inserted within a mobile device 104 and is paired with the associated mobile device. The profile is downloaded from the mobile device 104 to the UICC card 102 at step 302. Once the profile has been downloaded, the IMEI number associated with the mobile device 104 is obtained at step 304 by the UICC card 102. Since this is a new UICC card that presently does not have an IMEI number associated therewith, a determination that there is no IMEI match occurs at step 306. Inquiry step 310 determines if the profile downloaded to the UICC card 102 from the mobile device 104 indicates that the profile comprises a service provider profile that is associated with the UICC card 102. If not, the process is rejected at step 312 and no IMEI pairing occurs. If inquiry step 310 determines that the downloaded profile is a valid service provider profile, the IMEI number associated with the mobile device 104 is stored within the presently blank IMEI number location of the UICC card 102 at step 314. The pairing of the UICC card 102 and mobile device 104 is accepted at step 316 as a valid pairing enabling communications via the mobile device.

Figure 4:
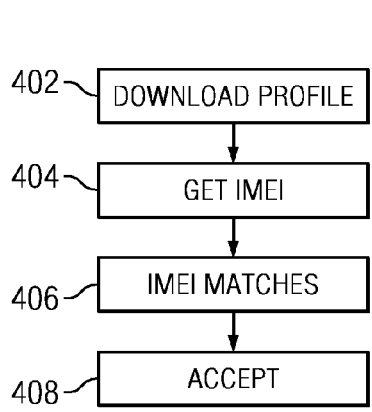
FIG. 4 is a flow diagram illustrating the situation where a presently assigned UICC card has been removed and then replaced into a matching mobile communication device.

Referring now to FIG. 4, there is a flow diagram illustrating the process when an old UICC card that has been previously paired with a particular mobile device 104 is removed from the mobile device and then returned back to the mobile device. In this process, when the UICC card 102 is placed back within its previously paired mobile device 104, the profile from the mobile device 104 is downloaded to the UICC card 102 at step 402. The IMEI number within the profile is obtained at step 404 such that a comparison can be made between the IMEI number of the mobile device 104 and the IMEI number presently stored within the UICC card 102. When it is determined that these numbers match at step 406, the paired combination of the UICC card 102 and the mobile device 104 is accepted and the mobile device user interface is enabled at step 408.

Figure 5:
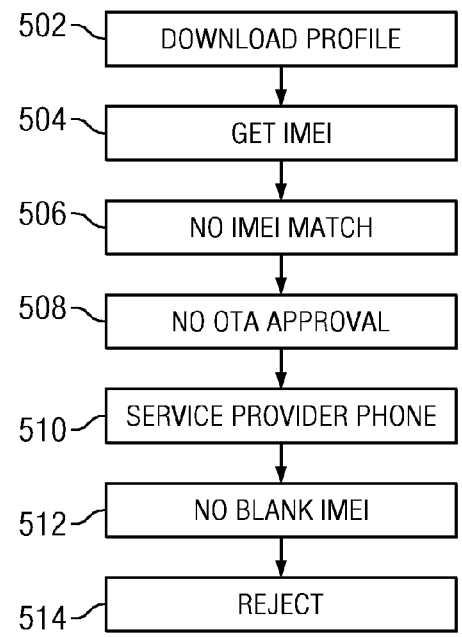
FIG. 5 is a flow diagram illustrating an attempt to place an old UICC card within a different mobile communication device.

Referring now to FIG. 5, there is illustrated the process that occurs when a previously utilized UICC card 102 with an old IMEI number attempts to pair with a new, unauthorized mobile device 104. Initially, the profile from the new mobile device 104 is downloaded to the old UICC card 102 at step 502. The IMEI number associated with the mobile device 104 is obtained at step 504. A determination is made at step 506 that the old IMEI number associated with the UICC card 102 does not match the IMEI number associated with the new mobile device. Likewise, no over-the-air approval is able to be obtained using the old card within the new mobile device at step 508 since this is an invalid pair. Next, at step 510 the determination is made that while this is a new phone, it comprises a phone of the service provider that is the same service provider associated with the UICC card. However, the storage location for the IMEI number within the UICC card 102 is presently not blank as determined at step 512. In this case, the pairing is rejected at step 514 because the old UICC card 102 IMEI number does not match the IMEI number of the new mobile device 104 even though the new mobile device is associated with the same service provider as the UICC card 102. A similar result would be achieved if a phone not associated with the service provider of the UICC card 102 were used.

Figure 6:
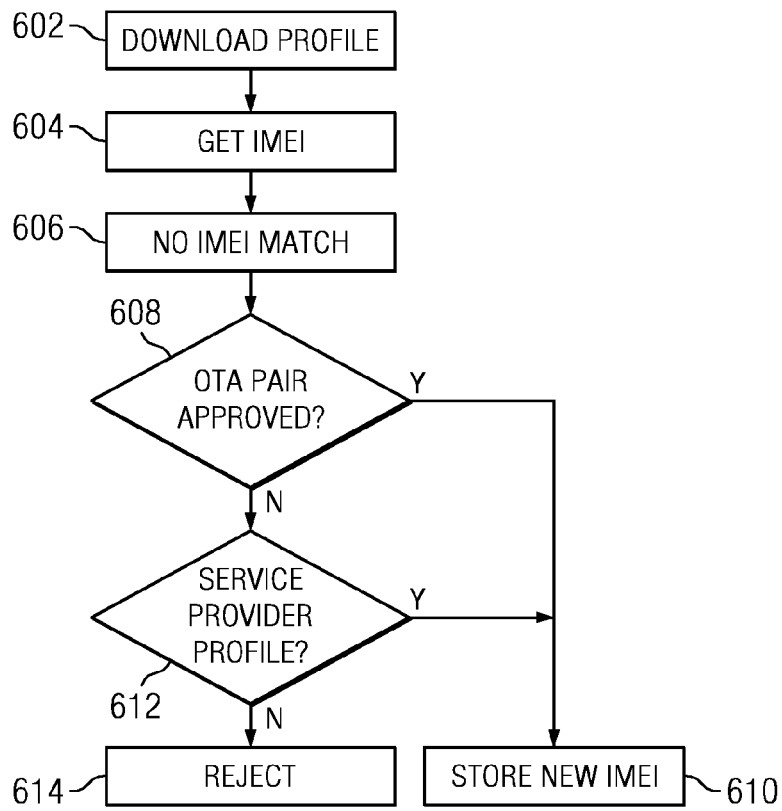
FIG. 6 is a flow diagram illustrating an attempt to use a new UICC card subject to an over-the-air network matching request.

Referring now to FIG. 6, there is illustrated the situation when a network approval via an over-the-air request is used for approving a new UICC card 102. The profile associated with the new mobile device 104 is downloaded to the UICC card 102 at step 602. The IMEI number is obtained at step 604, and since the card is new, no IMEI match is determined at step 606. Inquiry step 608 determines if an over-the-air approval of the IMEI pairs may be accomplished. If the over-the-air approval is obtained, the IMEI number downloaded from the mobile device is stored as the new IMEI number within the UICC card 102 at step 610. If inquiry step 608 does not provide the over-the-air approval because the device does not support OTA, control passes on to inquiry step 612 wherein the local approval is next attempted by determining if the service provider profile comprises a service provider associated with the UICC card 102. If so, the new IMEI number may be approved at step 610. Otherwise, if the mobile device profile does not comprise a service provider profile, the pairing is rejected at step 614.

Figure 7:
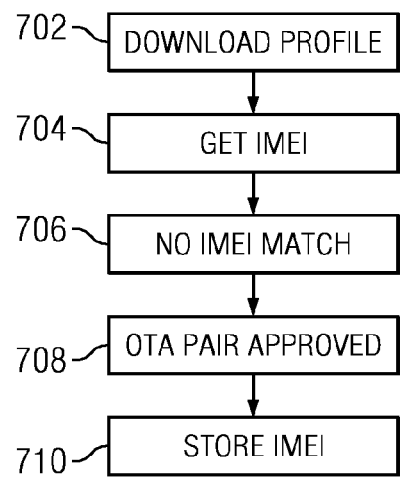
FIG. 7 is a flow diagram illustrating the UICC card having its previous IMEI number overridden by the over-the-air network request.

Referring now to FIG. 7, there is illustrated the situation wherein an over-the-air approval may be used to override an old IMEI number with a new IMEI number on the UICC card 102. This may occur for example in a situation wherein a subscriber obtains a new mobile device 104 to upgrade their older mobile device, but wishes to maintain the use of their previous UICC card 102. Initially, the profile is downloaded from the new mobile device 104 at step 702 to the UICC card 102. The IMEI number from the new mobile device is obtained at step 704 and since this is a new device, a determination is made that there is no IMEI number match at step 706. The over-the-air approval process may then be used to approve the new IMEI number received from the new mobile device 104 with the old UICC card at step 708, and this new IMEI number is stored within the UICC card 102 at step 710. Operations of the combination of the mobile communication device and the mobile device are enabled responsive to the comparison determining the first and second identifier's match. Operations are disabled for the combination of the mobile communication device and the mobile device responsive to the comparison determining that the first and second identifiers do not match.

It will be appreciated by those skilled in the art having the benefit of this disclosure that this system and method for pairing a UICC card with a particular mobile communications device provides a manner for limiting operations to a single card mobile device pair to control system access. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for pairing a mobile communications device card located within a mobile device with the mobile device, comprising the steps of:
   downloading a mobile device profile from the mobile device to the mobile communications device card inserted within the mobile device responsive to an activation of the mobile device, the mobile device profile indicating a service provider associated with the mobile device and a first identifier;
   retrieving the first identifier from the mobile device profile;
   comparing the first identifier associated with the mobile device with a second identifier associated with the mobile communications device card at the mobile communications device card;
   authorizing by the mobile communications device card an operation of combining of the mobile communications device card and the mobile device responsive to the comparison determining the first and second identifiers match;
   determining by the mobile communications device card if the mobile device has Bearer Independent Protocol (BIP) capability responsive to the mobile device profile;
   performing an over the air inquiry initiated by the mobile communications device card to a network providing wireless services to the mobile device to request an approval of an association of the mobile communications device card with the mobile device responsive to the comparison determining the first and second identifiers do not match if the mobile device has BIP capacity;
   storing by the mobile communications device card the first identifier as the second identifier for the mobile communications device card responsive to the approval of the association of the mobile communications device card with the mobile device from the network providing wireless services to the mobile device;
   determining by the mobile communications device card if the mobile device profile is associated with a same service provider that is identified by the mobile communications device card responsive to a determination the mobile device does not have BIP capacity or responsive to a disapproval of the association of the mobile communications device card with the mobile device from the network providing wireless services to the mobile device; and
   disabling by the mobile communications device card operation of a user interface associated with the mobile device responsive to a determination that the mobile device is not associated with the same service provider as the mobile communications device card.

2. The method of claim 1, wherein the mobile communications device card comprises a universal integrated chip card.

3. The method of claim 1, further comprising the steps of:
   determining by the mobile communications device card if the second identifier is currently stored for the mobile communications device card responsive to a determination that the mobile device is associated with the same service provider as the mobile communication device card;
   disabling by the mobile communications device card operation of the user interface associated with the mobile device responsive to a determination that the second identifier is currently stored for the mobile communications device card; and
   storing by the mobile communications device card the first identifier as the second identifier for the mobile communications device card responsive to a determination that the second identifier is not currently stored for the mobile communications device card.

4. The method of claim 1, further comprising the steps of:
   determining by the mobile communications device card if the second identifier is currently stored for the mobile communications device card;
   disabling by the mobile communications device card operation of the user interface associated with the mobile device responsive to a determination that the second identifier is currently stored for the mobile communications device card; and
   storing by the mobile communications device card the first identifier as the second identifier for the mobile communications device card responsive to a determination that the second identifier is not currently stored for the mobile communications device card.

5. The method of claim 1, wherein the step of disabling further comprises the step of disabling a user interface of the mobile device responsive to the comparison determining the first and second identifiers do not match.

6. A method for pairing a universal integrated chip card located within a mobile device with the mobile device, comprising the steps of:
   determining if a flag disabling a pairing process between the universal integrated chip card and the mobile device is set;

disabling the pairing process if the flag is set;
if the flag is not set:
  downloading a mobile device profile from the mobile device to the universal integrated chip card inserted within the mobile device, the mobile device profile indicating a service provider associated with the mobile device and a first identifier;
  retrieving the first identifier from the mobile device profile;
  comparing the first identifier associated with the mobile device with a second identifier associated with the universal integrated chip card at the mobile communications device card;
  authorizing by the universal integrated chip card an operation of combining of the universal integrated chip card and the mobile device responsive to the comparison determining the first and second identifiers match;
  determining by the universal integrated chip card if the mobile device has Bearer Independent Protocol (BIP) capability responsive to the mobile device profile;
  performing an over the air inquiry initiated by the universal integrated chip card to a network providing wireless services to the mobile device associated with a service provider of a communications network to request an approval of an association of the universal integrated chip card with the mobile device responsive to the comparison determining the first and the second identifiers do not match if the mobile device has BIP capability;
  storing by the universal integrated chip card the first identifier as the second identifier for the universal integrated chip card responsive to the approval of the association of the universal integrated chip card with the mobile device from the network providing wireless services to the mobile device;
  determining by the universal integrated chip card if the mobile device profile is associated with a same service provider that is identified by the universal integrated chip card responsive to a determination the mobile device does not have BIP capacity or responsive to a disapproval of the association of the universal integrated chip card with the mobile device from service network provider at the network providing wireless services to the mobile device; and
  disabling by the universal integrated chip card operation of a user interface associated with the mobile device responsive to a determination that the mobile device is not associated with the same service provider as the universal integrated chip card.

7. The method of claim 6, further comprising the steps of:
determining by the universal integrated chip card if the second identifier is currently stored for the universal integrated chip card responsive to a determination that the mobile device is associated with the same service provider as the universal integrated chip card;
disabling by the universal integrated chip card operation of the user interface associated with the mobile device responsive to a determination that the second identifier is currently stored for the universal integrated chip card; and
storing by the universal integrated chip card the first identifier as the second identifier for the universal integrated chip card responsive to a determination that the second identifier is not currently stored for the universal integrated chip card.

8. The method of claim 6, further comprising the steps of:
determining by the universal integrated chip card if the second identifier is currently stored for the universal integrated chip card;
disabling by the universal integrated chip card operation of the user interface associated with the mobile device responsive to a determination that the second identifier is currently stored for the universal integrated chip card; and
storing by the universal integrated chip card the first identifier as the second identifier for the universal integrated chip card responsive to a determination that the second identifier is not currently stored for the universal integrated chip card.

9. A system, comprising:
a mobile device having a first identifier associated therewith;
a mobile communications device card having a second identifier associated therewith associated with the mobile device;
a lock function stored on the mobile communications device card for enabling and disabling the mobile device responsive to a comparison of the first identifier and the second identifier, wherein the lock function:
  downloads a mobile device profile from the mobile device to the mobile communications device card inserted within the mobile device responsive to an activation of the mobile device, the mobile device profile indicating a service provider associated with the mobile device and a first identifier;
  retrieves the first identifier from the mobile device profile;
  compares the first identifier associated with the mobile device with the second identifier associated with the mobile communications device card at the universal integrated chip card;
  enables by the mobile communications device card an operation of the mobile device responsive to the comparison determining the first and second identifiers match; and
  performs an over the air inquiry via a home subscriber server inquiry initiated by the mobile communications device card to a network providing wireless services to the mobile device to request an approval of an association of the mobile communications device card with the mobile device responsive to the comparison determining the first and second identifiers do no match at the network providing wireless services to the mobile device;
  stores by the mobile communications device card the first identifier as the second identifier for the mobile communications device card responsive to the approval of the association of the mobile communications device card with the mobile device from the network providing wireless services to the mobile device;
  determines by the mobile communications device card if the mobile device profile is associated with a same service provider that is identified by the mobile communications device card responsive to a disapproval of the association of the mobile communications device card with the mobile device from the network providing wireless services to the mobile device;
  downloads a mobile device profile from the mobile device to the mobile communications device card; and disables by the mobile communications device card operation of a user interface associated with the mobile device responsive to a determination that the mobile device is not associated with the same service provider as the mobile communications device card.

10. The system of claim 9, wherein the lock function further:
retrieves the first identifier for the mobile device profile.

11. The system of claim 9, wherein the lock function further:
determines by the mobile communications device card if the second identifier is currently stored for the mobile communications device card responsive to a determination that the mobile device is associated with the same service provider as the mobile communication device card;
disables by the mobile communications device card operation of the user interface associated with the mobile device responsive to a determination that the second identifier is currently stored for the mobile communications device card; and
stores by the mobile communications device card the first identifier as the second identifier for the mobile communications device card responsive to a determination that the second identifier is not currently stored for the mobile communications device card.

12. The system of claim 9, wherein the lock function further:
determines by the mobile communications device card if the second identifier is currently stored for the mobile communications device card;
disables by the universal integrated chip card operation of the user interface associated with the mobile device responsive to a determination that the second identifier is currently stored for the mobile communications device card; and
stores by the mobile communications device card the first identifier as the second identifier for the mobile communications device card responsive to a determination that the second identifier is not currently stored for the mobile communications device card.

13. The system of claim 9, wherein the lock function further disables a user interface of the mobile device responsive to the comparison determining the first and second identifiers do not match.

* * * * *